(12) United States Patent
Lerner et al.

(10) Patent No.: US 7,644,682 B2
(45) Date of Patent: Jan. 12, 2010

(54) ROUND BALE FEEDER

(75) Inventors: Marc Lerner, Swan Lake, NY (US);
Steven Lerner, Monticello, NY (US);
Barbara Lerner, Swan Lake, NY (US);
Jerrold Lerner, New York, NY (US)

(73) Assignee: Quickway Metal Fabricators, Inc., Monticello, NY (US)

( * ) Notice: Subject to any disclaimer, the term of this patent is extended or adjusted under 35 U.S.C. 154(b) by 341 days.

(21) Appl. No.: 11/595,333

(22) Filed: Nov. 9, 2006

(65) Prior Publication Data

US 2008/0110403 A1 May 15, 2008

(51) Int. Cl.
*A01K 1/10* (2006.01)
*A01K 5/01* (2006.01)

(52) U.S. Cl. .................. 119/59; 119/58; 119/63

(58) Field of Classification Search ............ 119/58–60, 119/61.1–61.4, 65, 900–903; D30/131, 121; 414/911, 24.5; 296/6, 11; *A01K 1/10*
See application file for complete search history.

(56) References Cited

U.S. PATENT DOCUMENTS

| | | | | | |
|---|---|---|---|---|---|
| 1,216,203 | A | * | 2/1917 | Bower ..................... | 119/60 |
| 1,445,239 | A | * | 2/1923 | Reddig .................... | 248/646 |
| 1,874,418 | A | * | 8/1932 | Bantz et al. ............. | 119/61.3 |
| 2,709,988 | A | * | 6/1955 | Hatcher ................... | 119/62 |
| 2,830,558 | A | * | 4/1958 | St. Pierre ................ | 119/58 |
| 4,094,428 | A | | 6/1978 | White et al. | |
| D371,228 | S | * | 6/1996 | Monin ..................... | D30/121 |
| 5,586,519 | A | * | 12/1996 | Wilkinson ............... | 119/60 |
| D397,530 | S | * | 8/1998 | Lile ........................ | D30/131 |
| 6,789,504 | B1 | | 9/2004 | O'Neill | |

FOREIGN PATENT DOCUMENTS

| | | | |
|---|---|---|---|
| GB | 2033718 A | * | 10/1979 |
| GB | 2034570 A | * | 10/1979 |
| GB | 2125670 A | * | 5/1983 |

(Continued)

OTHER PUBLICATIONS

C&S Iron, Round Bale Feeders for Cattle, www.c-siron.com/feeder_panels.htm, Jul. 6, 2006.

(Continued)

*Primary Examiner*—Son T. Nguyen
(74) *Attorney, Agent, or Firm*—Alfred M. Walker

(57) ABSTRACT

An elevated feeder or framework holds the round bales of feedstock off the ground while providing a convenient height for the livestock to feed from. The bale feeder is made by rigidly connecting tubular elements, of the same or different diameters together, at any angle, without the use of special fasteners. The elevated feeder holds the bales with the flat ends in a position that is the most convenient for the livestock to consume the feedstock. The elevated feeder keeps the feedstock bales off the ground by supporting the feedstock on an adjustable, flexible mesh bale support, with openings to permit rain and water to drain away from the feedstock. The mesh bale support length is adjusted by moving the mesh support clamping bars closer to or farther away from the ends of the mesh raises or lowers the bale to accommodate the feeding height of the livestock being fed.

8 Claims, 5 Drawing Sheets

FOREIGN PATENT DOCUMENTS

GB        2152349 A    *    1/1984

OTHER PUBLICATIONS

Groff, Round Bale Feeders for Horses, www.abcgroff.com/ag/oneill1.htm, Jul. 6, 2006.

Hutchison, Round and Flex Bale Feeders, www.hutchison-inc.com/html/lvst_equ/feeding_equ/flexbale.php, Jul. 6, 2006.

O'Neill, Features of the O'Neill Round Bale Hay Feeder, www.oneillbalefeeders.com/roundfeeder.htm, Jul. 6, 2006.

O'Neill, Round Bale Feeder for Horses, www.oneillbalefeeders.com/, 2004.

Patriot Bale Feeders, www.mindenmachine.com/bale_feeders.htm, Jul. 6, 2006.

SheepCRC, the Cowra bale feeder for sheep, www.sheepcrc.org.au/articles.php?rc=124, 2000.

Wright, Round-Bale Feeder for Horses, http://www.omafra.gov.on.ca/english/livestock/horses/facts/06-075.htm, Apr. 1, 2006.

* cited by examiner

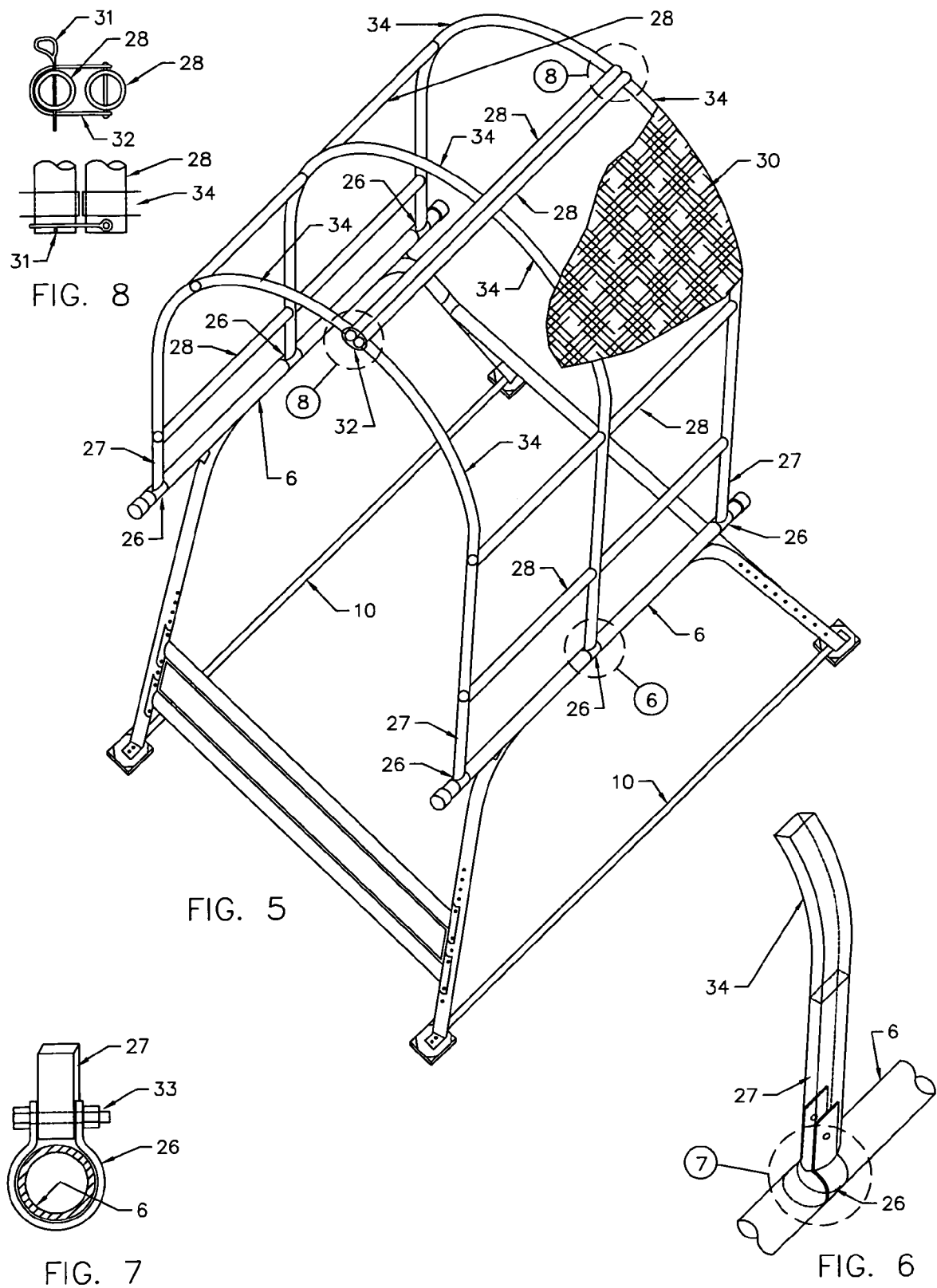

ROUND BALE FEEDER

FIELD OF THE INVENTION

The present invention relates to ROUND BALE FEEDERS for agricultural field use.

BACKGROUND OF THE INVENTION

Hay that was once formed into relatively small rectangular bales is now typically formed into larger round bales typically weighing 800 to over 1000 pounds. On a farm, these bales are lying in the field where they were harvested, with their axis horizontal (parallel to the ground). Typically they are moved with a farm tractor having a front end loader attachment fitted with a spike which enters one of the flat ends of the bale, so it can be lifted off the ground before moving it to another location.

Several types of round bale feeders which surround a bale either on the ground or on a raised platform are also available from suppliers. These are used to contain the bale during the feeding of animals such as horses, cattle or sheep. Many of these are designed to accept a round bale that has been flipped from the horizontal axis onto one of its flat ends so that the axis is now perpendicular to the ground. This not an easy task and requires the hydraulics of a tractor or other apparatus to grasp the horizontal bale and rotate it 90 degrees, before depositing it onto a feeder.

A round bale feeder for horses is described in U.S. Pat. No. 6,789,504 B1 of O'Neill. It is formed of several rings spaced apart by straight members and welded into a stand with a horizontal axis and raised on a base which spaces it from the ground. It accepts round bales from either end after a door is opened. It does eliminate the need to rotate the round bale 90 degrees prior to loading into the feeder. The chore of loading the feeder of O'Neill must be performed precisely by an experienced person since the alignment of a spiked round bale on a front loader requires skill in guiding it into the enclosure formed by the several rings. This is especially problematic considering that round bales can be more than five feet in diameter, and may not be perfectly round due to the settling of the heavy round bale. The situation is further hampered by poor visibility around the bale, for the equipment operator moving the suspended hay bale. Only larger diameter rings on the feeder, which add material bulk and weight to the feeder, ameliorate some of the loading problems.

OBJECTS OF THE INVENTION

It is therefore an object of this invention to provide an elevated feeder or framework to hold round bales off the ground and to keep the round bale dry while providing a convenient height for the livestock to feed from, and to make the height of the bales adjustable for the feeding of livestock of different sizes.

It is another object of this invention to provide a feeder for round bales which accepts the bales with their axle in a horizontal orientation to eliminate the requirement of rotating the round bales onto their flat end, for the more convenient consumption of the feedstock by the livestock being fed.

It is a further object of this invention to facilitate the loading of a round bale of feedstock onto the feeder of this invention without difficulty, even by inexperienced personnel using equipment found on almost all farms.

It is another object of this invention to provide a feeder that is light enough that it can be moved by hand to avoid the buildup of manure and waste feedstock around it.

It is yet another object of this invention to limit the scattering of hay or other feedstock on the ground where it becomes inedible due to being trampled or urinated on.

It is also an object of this invention to provide a feeder which holds the flat ends of the bale in a vertical position facing the livestock being fed, which is the most convenient feeding position.

Another object of this invention is to keep the round bales of feedstock off the ground by supporting them on an adjustable, flexible mesh bale support.

Still another object of the invention is to create a connection method to rigidly secure the various tubular members of the elevated feeder together to create a rigid framework using simple tools which permit the shipping of the feeder in unassembled form to reduce the cost of shipping and handling.

It is a further object of this invention to limit the scattering of hay or other feedstock on the ground by utilizing some of the series of additional holes provided in the legs of the feeder. This enables the feeders horizontal end cross members and the panel between them, to be adjusted in height by using the appropriate holes to bolt the cross members and the panel, at a higher or lower level to accommodate the needs of the livestock being fed.

An additional object of the invention is to provide an optional arched framework with a rigid or flexible covering. This arched framework preferably would be made in two halves that were hinged to the upper horizontal side frame mesh support rails, using bands that encircle the rails and are attached to the lower ends of the 90 degree segments of the arched framework. Opening this hinged framework would permit the unimpeded loading of the feeder, then closing the two arched frames would reestablish the weather resistant properties of the arched framework of this invention.

Flat foot pads with bent corners that dig into the ground, help keep the feeder's legs from sinking into soft ground when loaded with a heavy bale of feedstock.

SUMMARY OF THE INVENTION

The bale feeder of this invention includes two trapezoidal side frames, made up of tubular members that are attached to each other with horizontal cross members and a panel between them. It has an adjustable, flexible mesh bale support suspended from the upper tubular horizontal rails, which has the dual purpose of supporting the round bale of feedstock off the ground as well as permitting rain or water to drain through the openings in the mesh bale support, thereby keeping the hay or feedstock dry and away from the ground. Since it has no confining fixed framework or top cover over the stand, it is easy to load a round bale of feedstock onto the feeder using a front loader fitted with a spike or other suitable mechanical implement. The various tubular members are attached together using rigid, purpose fitted, bolted connections. This allows the feeder of this invention to be conveniently shipped at minimal cost and assembled by the purchaser using ordinary wrenches and small hand tools. Using a minimum of separate corrosion resistant parts, the feeder is very strong, yet light in weight, since its parts are not oversized and used for maximum utility and strength.

To summarize, the bale feeder includes two upper horizontal parallel rails, supported by four braced legs with a section of flexible mesh forming a cradle, attached to and between the two upper horizontal rail members of the side frames to form a basket shape which accepts and supports the round bale. The length of the flexible mesh bale support can be adjusted by changing the position of the end clamping bar, closer to, or farther from the end of the flexible mesh. This results in an increase or decrease in the height of the bale support mesh from the ground and a subsequent raising or lowering of the height of the bale being fed to the livestock.

An optional arched frame cover is also part of this invention. The arched framework includes a number of curved tubular sections to form a semicircular roof section. These are spaced apart and attached to each other by straight tubular members. The arched surface is covered by a fabric or rigid covering to shed rain or snow. The lower ends of the arched frames are attached to the upper horizontal rails of the feeder with band loops which encircle the upper horizontal rails. This framework is formed in two clamshell like halves. Each covered top section of the 90 degree arc is hinged onto the upper horizontal rail of the feeder so that it can be easily opened to facilitate the completely unencumbered loading of the bales onto the feeder. The clamshell halves are then closed and latched to reestablish the weather resistant qualities of the feeder when used with this optional cover. The use of this optional two piece arched cover, in the open position is the equivalent of not having any cover at all when loading round bales onto the feeder.

BRIEF DESCRIPTION OF THE DRAWINGS

The present invention can best be understood in connection with the accompanying drawings. It is noted that the invention is not limited to the precise embodiments shown in the drawings, in which:

FIG. 5 is a perspective view of the two trapezoidal side frames with two end cross frame members and the panel between them, attached through the holes in the sloped leg members of the side frames with bolts or other means. It also shows the arched clamshell cover and frame attached to the upper horizontal rail members of the bale stand. (The flexible mesh bale support is not shown for clarity.)

FIG. 6 is a perspective detail of the band hinge attachment of a vertical arched tube of the clamshell cover frame member to the upper horizontal rail of the feeder's trapezoidal side frames.

FIG. 7 is an end view cross section of the band hinge attachment of FIG. 6.

FIG. 8 is an end view detail of the pinned link which forms a latch to connect the two clamshell sections of the cover frame together.

DETAILED DESCRIPTION OF THE INVENTION

Figure 1:
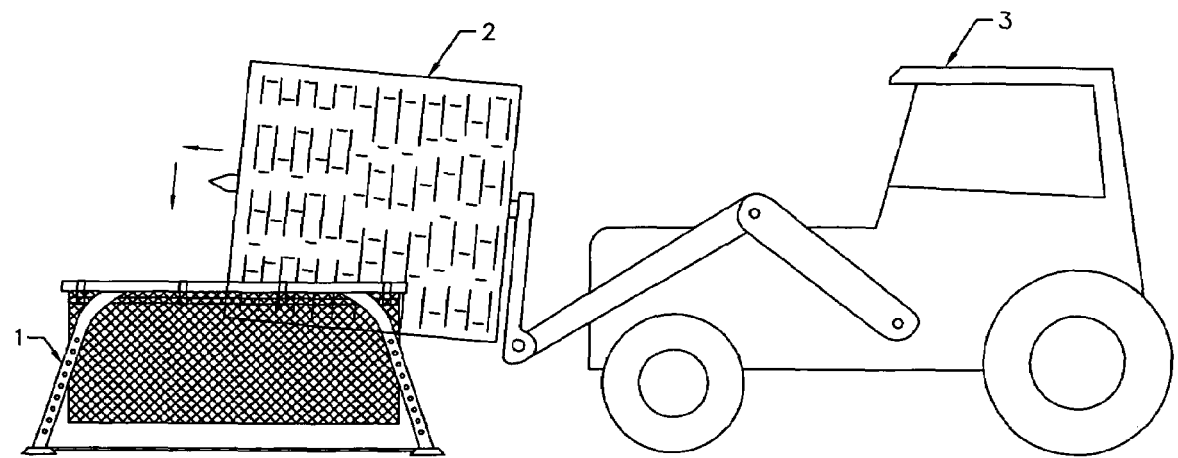
FIG. 1 is a side elevation of the operation of loading a round bale of feedstock onto the feeder of this invention, using a farm tractor equipped with a front loader attachment fitted with a spike.

FIG. 1 shows a round bale 2 of feedstock being moved into position for loading onto the feeder of this invention. Bale 2 is supported by a spike attached to a front loader attachment of a farm tractor 3.

Figure 3:
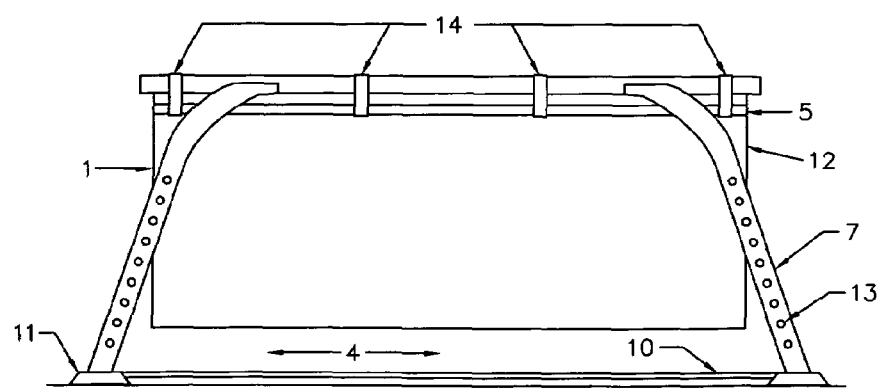
FIG. 3 is a side view of the trapezoidal side frame of the invention, with a series of holes in the sloped leg members, to provide for the adjustment in the height of the horizontal cross members and the panel members.
Figure 2:
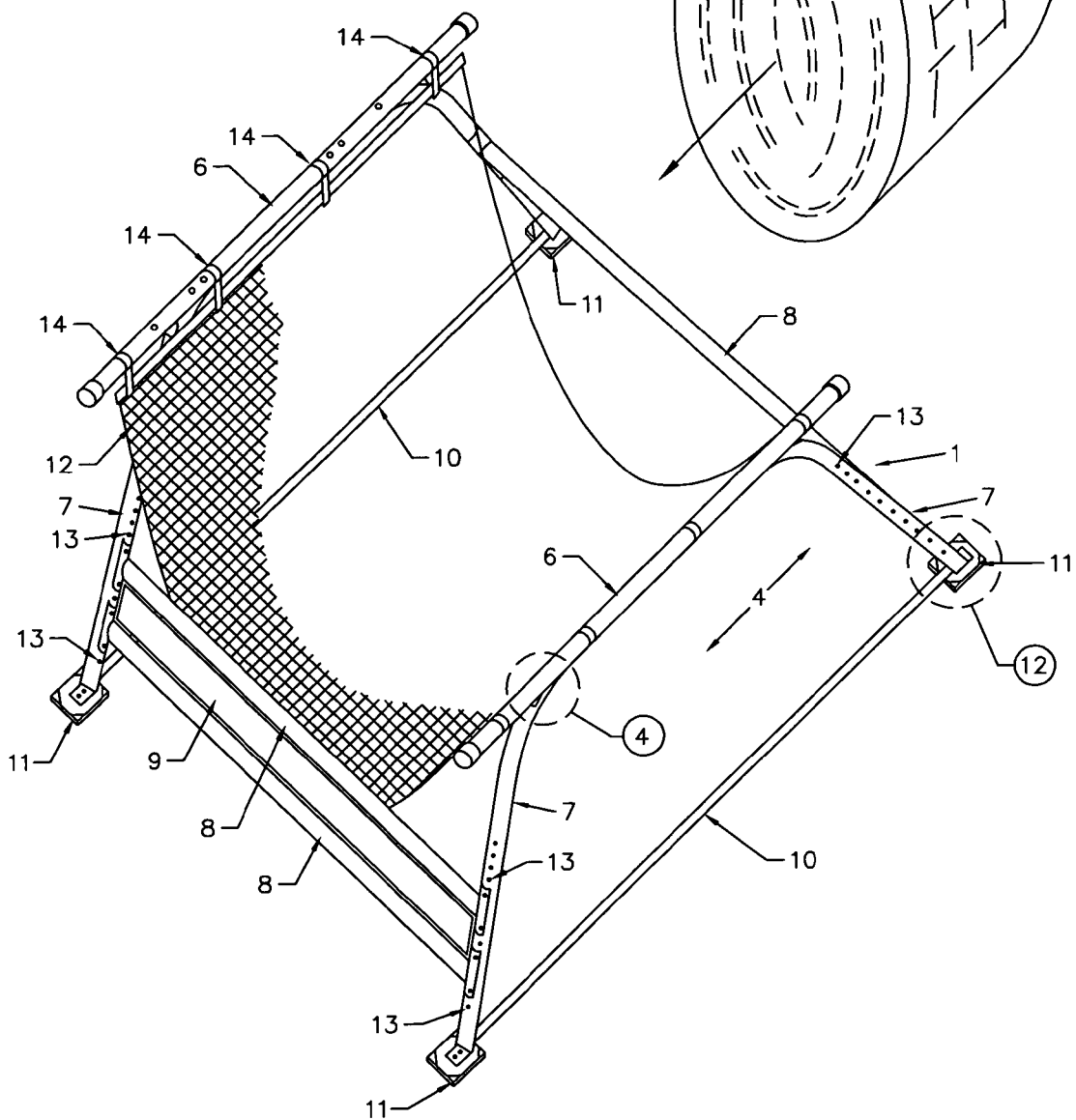
FIG. 2 is a perspective view of the feeder of the invention showing the various parts therein.
Figure 13:
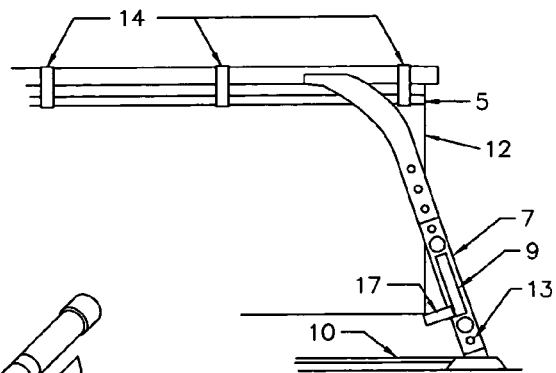
FIG. 13 shows the filler block 17, attached to the rear bottom edge of the panel 9, which further reduces the spillage of feedstock from the mesh bale support 12. This is used when the cross members 8 and the panel 9 are set in the low position to reduce wastage of the feedstock due to the space created by the slope of the legs 7 and the panel 9 away from the mesh bale support 12.

FIG. 2 is a perspective view which shows the major components of the feeder 1. While other frames such as ones with vertical legs might be provided, in the preferred embodiment, there is provided on each side a trapezoidal side frame, as in FIG. 3, typically including frame members such as sloped tubular legs 7, an upper horizontal tubular rail 6 and a lower bottom tension member 10, which create a very rigid side frame 1. These two trapezoidal frames are spaced apart and attached to each other by horizontal cross members 8 with an end panel 9 optionally pre-attached between the cross members 8. In one embodiment, end panel 9 is attached by bands, clips or other suitable attachments to the upper and lower cross members 8. Note, additional holes 13 in leg 7 are provided to permit the adjustment in the height of cross members 8 and end panel 9 to control the feeding height for taller or shorter animals. These additional holes 13 also permit the use of wider end panels 9 which can be used to further control any spillage of feedstock from the feeder. This is accomplished by adjusting the space between the cross members 8 to accommodate the wider panel 9. An additional filler block 17 could also be attached to the rear of the bottom edge of the panel 9 to further restrict the opening between the panel 9 and the mesh bale support 12, that occurs when the cross members 8 and the panel 9 are fastened to the feeder 1, in a lower position due to the outward slope of the angled tubular legs 7 as shown in FIG. 13.

Figure 9:
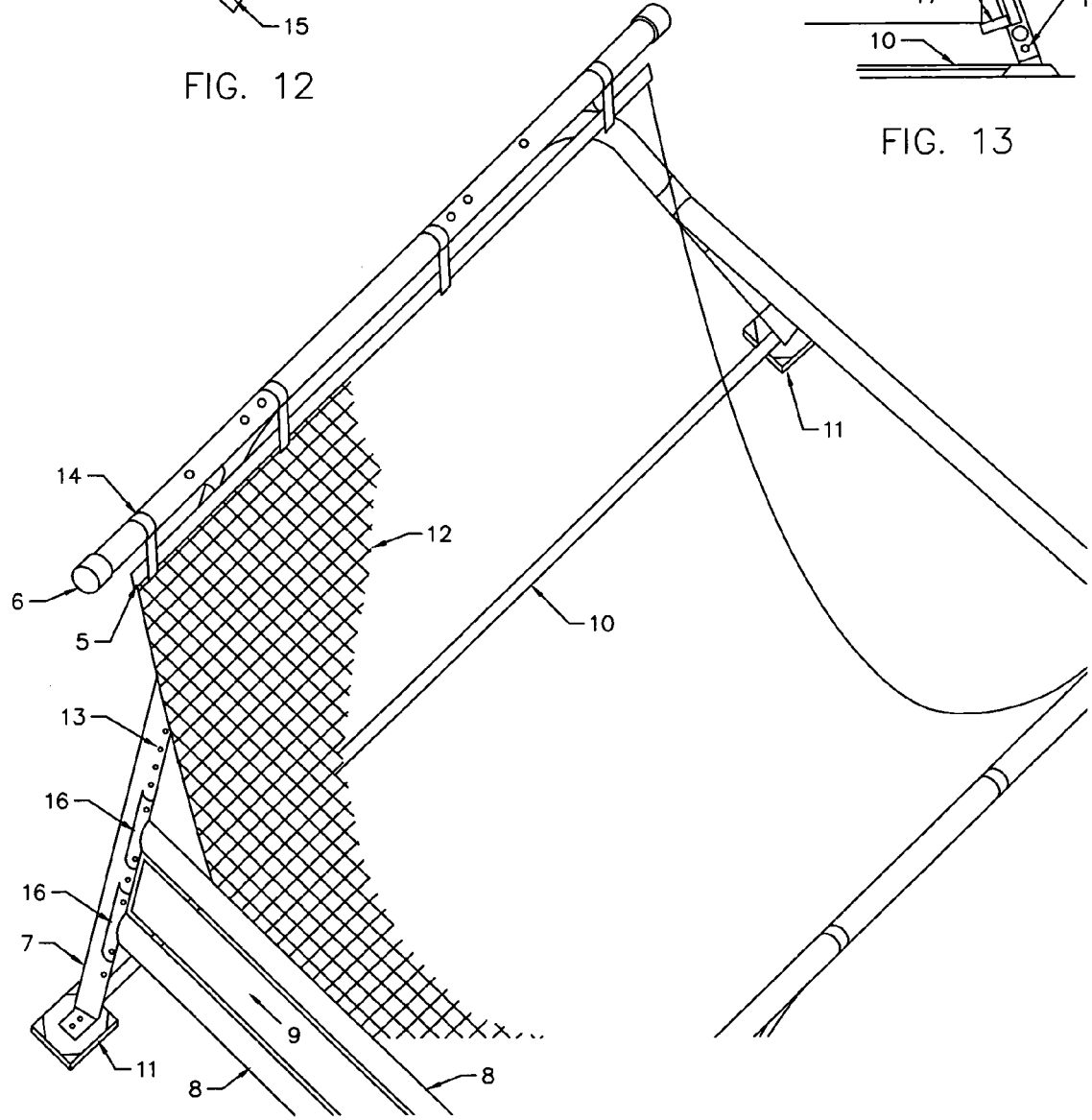
FIG. 9 is a perspective view of a method that can be used to attach the flexible mesh bale support to the upper horizontal rails of the trapezoidal side frames, using bands that encircle the upper rail and are clamped to the bars that can be threaded through the openings across the mesh at or near the ends of the section of flexible mesh bale support material. Threading the bars through an area closer to or farther from the ends of the mesh bale support material shortens or lengthens the effective length of the mesh bale support. This permits the adjustment of the height of the bale that is supported by the flexible mesh bale support.

FIG. 2 and FIG. 9 also show that cross members 8 have attached concave flanges 16 to their ends with one or more holes 13 which permit attachment of the concave attachment flanges 16 to holes 13 in legs 7. Holes 13 are provided in an array along an elongated portion of legs 7, of FIG. 3, to provide attachment points at variable heights, to match the feeding requirements of the livestock, depending upon the height of the animal.

As an example; for taller animals such as horses, concave flanges 16 at the ends of cross members 8 are attached to legs 7 by fasteners, such as bolts, inserted through the holes 13 in the flanges 16, to the respective upper holes 13 of the legs 7. These upper holes are provided at the higher portion of the array of holes 13 of the legs 7. Bolting the concave flanges 16 at the ends of the cross members 8 to the upper portion of this array of holes 13 of the legs 7 results in the cross members 8 and end panel 9 being positioned higher up on legs 7.

As an example; for shorter animals such as sheep, concave flanges 16 at the ends of cross members 8 are attached to legs 7 by fasteners, such as bolts, inserted through the holes 13 in the flanges 16, at the ends of the cross members 8, to the lower portion of the array 13 of the legs 7. This results in the cross members 8 and end panels 9 being positioned lower on leg 7.

Figure 4:
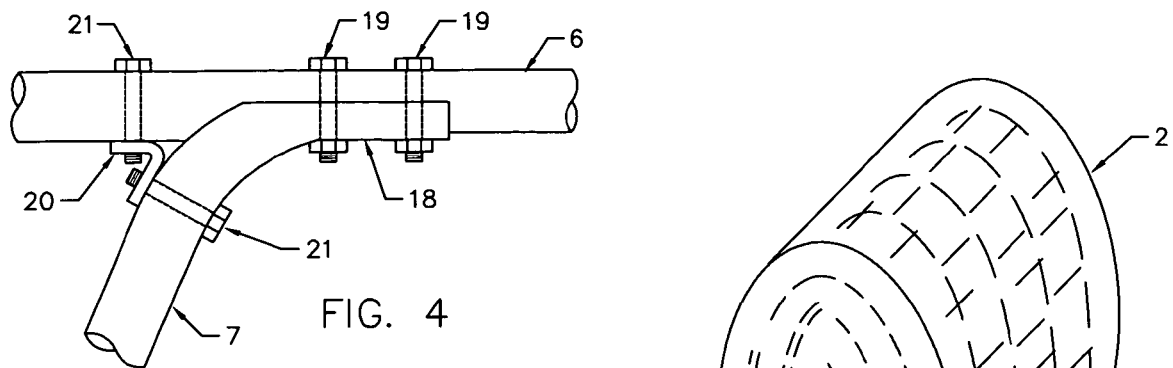
FIG. 4 is a detail side elevation of the formed connection and parts between the top horizontal rail and a sloped leg member.

The attachment of angled frame members (legs) 7 to elements such as the upper horizontal tubular rails 6 is detailed in FIG. 4. The upper end of each leg 7 is bent to the angle of the intersection required and is extended as a short straight projection to provide an area for the required fasteners. The bent end of the tube and projection is then reformed, by putting it into a press with an appropriate punch and die, to deform the bent end of the tube by inverting half of the tube diameter into the other half, to form a semicircular saddle to fit under the horizontal rail member 6. This is illustrated in the detail of FIG. 4, where fasteners such as bolts and nuts 19, are used to attach saddle area 18 to upper horizontal rail member 6. Clamps or other types of screws can be used instead to make this connection. A fastener, such as a small double tap knee nut 20 is inserted into the angular crotch, between member 6 and the bent portion of leg tube 7, to make the connection completely rigid. Fasteners such as bolts and nuts 19 fasten the tubular elements through appropriately drilled holes to make these connections.

FIG. 9 shows the flexible mesh bale support 12 which is attached to the upper horizontal rail member 6 of the invention, with bands 14 that encircle the horizontal rails member 6 whose ends are attached or clamped to a bar 5 running transversely through the openings across the ends of the flexible mesh bale support 12, thus permitting the shortening or lengthening of the mesh bale support 12, to raise or lower the height of the bale 2 being supported on the feeder 1. Preferably, band clamps 14, shown in FIG. 9, attach the bar 5 to the horizontal rail member 6, and clamp or bolt to the bar 5.

When a larger number of cattle, sheep, horses or other animals feed on a round bale of feedstock 2 in the feeder 1, it can be entirely consumed in the very short period of time (a few days). In such instances a cover is not required. This is illustrated in FIG. 2.

However, an optional canopy to protect the bale from exposure to rain or snow is a useful accessory if the bale of feedstock 2 is to remain on the feeder 1 for an extended period of time. An optional canopy frame 36 is shown attached to the bale feeder frame as shown in FIG. 5. By forming the canopy 36 in two sections, each section's lower ends can be attached to the upper horizontal rail 6, by using an encircling band 26 around the horizontal rail 6, and which is attached to the lower ends 27 of the canopy's arched framework ends, as shown in FIG. 7. These bands 26 form a hinge so that the two halves can be opened clamshell style, to load a bale 2 onto the feeder 1, without any encumbrance to the loading operation, as in FIG. 10. When the clamshell cover of the canopy 36 is closed, the two upper tubing sections 28 that meet at the top of the closed canopy halves, can be latched together via an end link 32 and a latch pin 31, which engages the ends of both top tubes 28 as shown in detail in FIG. 8. Each 90 degree curved section 34 is covered separately with covering 30, which can be a water repellant material such as canvas or a rigid covering 30.

Figure 11:
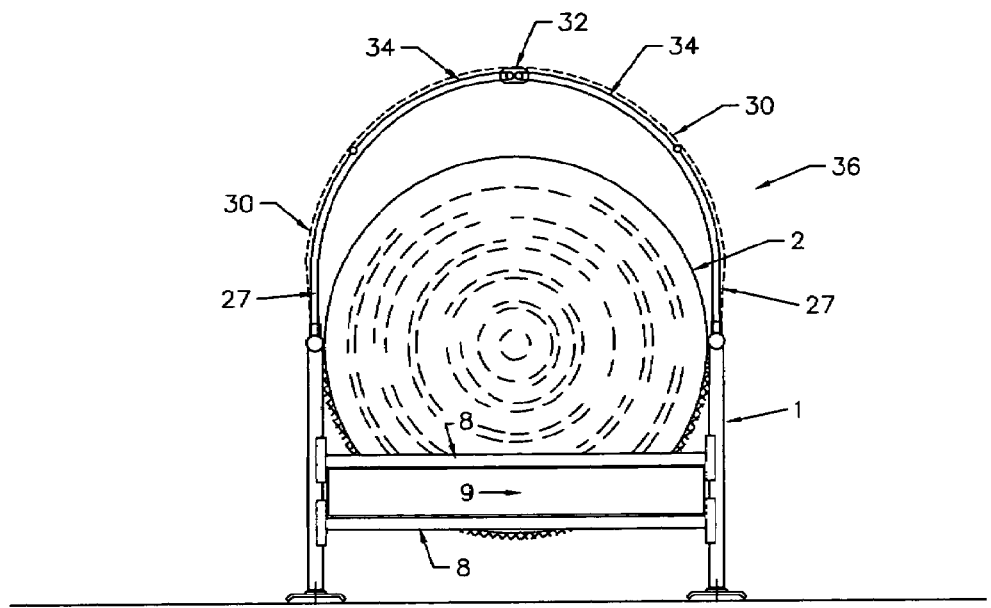
FIG. 11 is an end elevation showing a round bale in the feeder with the clamshell cover closed and the bale protected from the elements, as in the feeding position.

An end view of the clamshell cover in the closed and latched configuration 32 is shown in FIG. 11. Note that the clearance "X" from the top of a new bale to the canopy covering 30 is provided for ventilation if desired, and as a space for the bale 2, when the mesh bale support 12 is in a high position. For loading, the clamshell halves are opened, as in FIG. 10.

Figure 10:
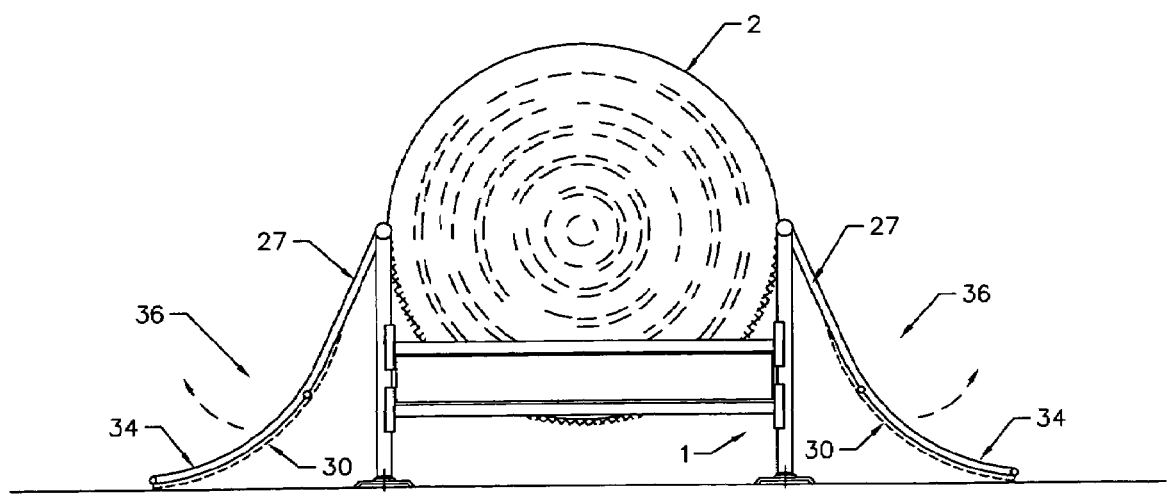
FIG. 10 is an end elevation showing a round bale in the feeder with the clamshell cover open as in the bale loading operation.

FIG. 10 shows the hinged clamshell cover 36 in the open position as when loading a bale of feedstock 2 onto the feeder 1. This is the equivalent of the feeder 1 not having any covering means at all to encumber the loading operation.

FIG. 11 shows the hinged clamshell cover 36 in the closed and latched position, in which the bale is protected from the elements and available for the livestock to be fed.

Figure 12:
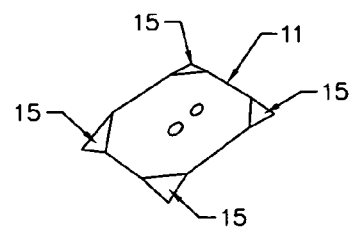
FIG. 12 is a perspective detail of one of the foot pads of the invention with downward bent corners that dig into the ground to resist the movement of the feeder by the livestock being fed and help keep the legs from sinking into the soft ground.

In a preferred embodiment a plurality of base stabilizers such as the four flat foot pads 11, are used, as shown in FIG. 12, whose function is to minimize the sinking of the feeder's legs 7 into soft ground. The downward bent corners 15 of the flat foot pads 11 are intended to dig into the earth, to resist the lateral movement of the feeder 1 that might result from pushing by the livestock being fed.

FIG. 13 shows the filler block 17, attached to the rear bottom edge of the panel 9, which further reduces the spillage of feedstock from the mesh bale support 12. This is used when the cross members 8 and the panel 9 are set in the low position, to reduce wastage of the feedstock due to the space created by the slope of the legs 7 and the panel 9 away from the mesh bale support 12.

In the foregoing description, certain terms and visual depictions are used to illustrate the preferred embodiment. However, no unnecessary limitations are to be construed or illustrations depicted, beyond what is shown in the prior art, since the terms and illustrations are examplary only, and are not meant to limit the scope of the present invention.

It is further known that other modifications may be made to the present invention, without departing the scope of the invention, as noted in the appended Claims.

We claim:

1. A round bale of feedstock feeder comprising:
   a pair of spaced side frames, each side frame having first and second spaced legs with an upper horizontal rail joining top ends of said first and second legs and a lower tension member joining lower ends of said first and second spaced legs to form rigid side frames;
   a pair of spaced cross members joining each pair of corresponding legs of said spaced side frames, said cross members not being welded to said legs, and being independently adjustable along said legs, forming a bale feeder frame;
   a support for said bale between said side frames comprising a flexible mesh suspended from the upper horizontal rails joining the top ends of said legs of each of said pair of side frames, whereby said bale is supported above ground to prevent contamination and rotting of the bale feedstock and to permit drainage of any water in said bale; and
   a solid side panel between each pair of spaced crossed members whereby moving of said spaced crossed members along with said side panel up and down said legs allows feeding height to be adjusted for the size of an animal being led, and forming a barrier to keep the animals being from climbing up onto said flexible mesh.

2. The bale feeder of claim 1 in which bands suspended from said upper horizontal rails join supporting edges of said flexible mesh whereby said flexible mesh may be raised or lowered by shortening or lengthening of said bands.

3. The bale feeder of claim 2 in which said bands are connected to clamping bars threaded through said flexible mesh thereby permitting shortening and lengthening of said bale support.

4. The bale feeder of claim 3 in which the legs of each side frame are sloped outwardly and a filler block is mounted on a bottom edge of each side panel to reduce spillage of feedstock from said flexible mesh due to said side panel moving further away from said flexible mesh as said side panel is lowered.

5. The bale feeder of claim 4 in which said side frames are made of tubular members rendering the feeder to be sufficiently light to be moved by hand to a different location.

6. The bale feeder of claim 5 having an arched cover mounted rotatably on each of said upper horizontal rails, the arched covers being rotatable between open positions splayed outwardly on a ground surface and a closed position in which a leading edge of one cover meets a leading edge of the other cover fully enclosing said bale of feedstock resting on said flexible mesh and protecting said bale from the elements while allowing said animals to feed.

7. The bale feeder of claim 6 in which the leading edges of said arched covers have a latch and pin assembly for locking said covers together when deployed to cover said bale.

8. The bale feeder of claim 7 in which a bottom of each leg is equipped with a flat plate with turned down corners to keep said legs from sinking into soft ground and from sliding to the ground due to said bale feeder being pushed by livestock being fed.

* * * * *